(12) United States Patent
Watanabe et al.

(10) Patent No.: US 9,536,479 B2
(45) Date of Patent: *Jan. 3, 2017

(54) IMAGE DISPLAY DEVICE AND METHOD

(71) Applicant: FUJIFILM Corporation, Tokyo (JP)

(72) Inventors: Mikio Watanabe, Saitama (JP); Masaya Tamaru, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/810,292

(22) Filed: Jul. 27, 2015

(65) Prior Publication Data

US 2015/0332636 A1 Nov. 19, 2015

Related U.S. Application Data

(63) Continuation of application No. 14/492,745, filed on Sep. 22, 2014, now Pat. No. 9,117,410, which is a (Continued)

(30) Foreign Application Priority Data

Mar. 22, 2012 (JP) ................................. 2012-065738

(51) Int. Cl.
*G09G 3/34* (2006.01)
*G09G 3/20* (2006.01)
(Continued)

(52) U.S. Cl.
CPC .......... *G09G 3/3413* (2013.01); *G09G 3/2092* (2013.01); *G09G 3/3426* (2013.01);
(Continued)

(58) Field of Classification Search
None
See application file for complete search history.

(56) References Cited

U.S. PATENT DOCUMENTS 7,581,837 B2 9/2009 Whitehead et al.
2004/0212688 A1 10/2004 Takano et al.
(Continued)

FOREIGN PATENT DOCUMENTS

JP 2004-328532 A 11/2004
JP 2009-63694 A 3/2009
(Continued)

OTHER PUBLICATIONS

International Preliminary Report on Patentability, dated Aug. 12, 2013, issued in PCT/JP2013/056732.
(Continued)

*Primary Examiner* — Joseph Haley
(74) *Attorney, Agent, or Firm* — Birch, Stewart, Kolasch & Birch, LLP

(57) ABSTRACT

An image display method includes the steps of: acquiring a third image formed by applying dynamic range extension processing to a first image and a second image photographed with low sensitivity or low exposure with respect to the first image, or a fourth image without dynamic range extension processing; displaying the acquired image in a transmissive type display panel; and making backlight luminance of a segment corresponding to a high luminance portion in the third image higher than backlight luminance of a segment corresponding to a low luminance portion when the acquired image is determined to be the third image.

10 Claims, 12 Drawing Sheets

Related U.S. Application Data continuation of application No. PCT/JP2013/056732, filed on Mar. 12, 2013.

(51) Int. Cl.
  *G09G 3/36* (2006.01)
  *H04N 5/235* (2006.01)

(52) U.S. Cl.
  CPC ......... *G09G 3/3607* (2013.01); *G09G 3/3648* (2013.01); *H04N 5/2355* (2013.01); *G09G 2320/062* (2013.01); *G09G 2320/066* (2013.01); *G09G 2320/0646* (2013.01); *G09G 2360/16* (2013.01)

(56) References Cited

U.S. PATENT DOCUMENTS

| | | |
|---|---|---|
| 2008/0007574 A1 | 1/2008 | Yoshida et al. |
| 2008/0309811 A1 | 12/2008 | Fujinawa et al. |
| 2008/0316167 A1 | 12/2008 | Kurokawa et al. |
| 2014/0009513 A1 | 1/2014 | Noutoshi et al. |
| 2014/0044366 A1* | 2/2014 | Yamaguchi ............. G06T 11/60 382/232 |
| 2014/0168486 A1 | 6/2014 | Geiss |

FOREIGN PATENT DOCUMENTS

| | | |
|---|---|---|
| JP | 2010-97909 A | 4/2010 |
| JP | 2010-187300 A | 8/2010 |
| JP | 2012-220672 A | 11/2012 |
| WO | WO 2006/082883 A1 | 8/2006 |

OTHER PUBLICATIONS

International Search Report, mailed Apr. 9, 2013, issued in PCT/JP2013/056732.
Notice of Allowability dated Apr. 15, 2015 issued in U.S. Appl. No. 14/492,745.
Written Opinion of the International Searching Authority, mailed Apr. 9, 2013, issued in PCT/JP2013/056732.

* cited by examiner

IMAGE DISPLAY DEVICE AND METHOD

CROSS-REFERENCE TO RELATED APPLICATIONS

This application is a Continuation of copending application Ser. No. 14/492,745 filed on Sep. 22, 2014, which is a Continuation of PCT International Application No. PCT/JP2013/056732 filed on Mar. 12, 2013, which claims priority under 35 U.S.C. §119(a) to Japanese Patent Application No. 2012-065738 filed on Mar. 22, 2012. Each of the above applications is hereby expressly incorporated by reference, in their entirety, into the present application.

BACKGROUND OF THE INVENTION

Field of the Invention

The present invention relates to an image display device and method, and particularly to a technique of controlling backlight luminance of a transmissive display panel.

Description of the Related Art

There has been provided a liquid crystal display device having a function (backlight local dimming (BLD) function) of individually controlling a backlight luminance of each of segments of a backlight unit provided in a back face of a liquid crystal panel (Japanese Patent Application Laid-Open No. 2010-097909 (PTL 1)).

The liquid crystal display device controls backlight luminance for each of areas so that the backlight luminance increases in a bright area of an image and decreases in a dark area thereof in accordance with a luminance level of the image to be displayed in the liquid crystal panel. Accordingly, a contrast rate of bright and dark portions increases to enable an image with a wide dynamic range to be displayed.

In addition, a display described in U.S. Pat. No. 7,581,837 (PTL 2) has a first optical modulator that allows light to focus on a rear projection screen, and a second optical modulator provided in the rear projection screen, thereby enabling an image with a wide dynamic range to be displayed by allowing the two optical modulators to modulate light.

SUMMARY OF THE INVENTION

The invention described in PTL 1 controls backlight luminance (BLD control) for each of areas so that the backlight luminance increases in a bright area of an image to be displayed in a liquid crystal panel and decreases in a dark area thereof. As a result, according to the invention described in PTL 1, it is possible to display an image with a wide dynamic range. Unfortunately, in the invention described in PTL 1, backlight luminance may be changed even in a low luminance area and an intermediate luminance area, for example, so that gradation becomes high contrast to display an unnatural image.

The invention described in PTL 2 is also capable of displaying an image with a wide dynamic range. Unfortunately, PTL 2 does not disclose a technique of reproducing and displaying an image with a natural vision.

The present invention is made in light of the above-mentioned circumstances, and an object of the present invention is to provide an image display device and method, capable of faithfully reproducing and displaying a photographing scene with a wide dynamic range.

In order to achieve the object above, an image display device in accordance with one aspect of the present invention includes: an image acquisition unit configured to acquire a third image formed by performing dynamic range extension processing by using a first image and a second image which is photographed with lower sensitivity or lower exposure with respect to the first image, or a fourth image without dynamic range extension processing; a transmissive type display panel configured to display the third image or the fourth image acquired by the image acquisition unit; a backlight unit that is provided in a back face of the transmissive type display panel, the backlight unit configured to control luminance of backlight with respect to the transmissive type display panel for each of divided segments; a determination unit configured to determine whether an image acquired by the image acquisition unit is the third image or the fourth image; and a control unit configured to control the backlight unit so that backlight luminance of a segment corresponding to a higher luminance portion suppressed by dynamic range extension processing in the third image becomes higher than backlight luminance of a segment corresponding to a lower luminance portion in the third image, when the image acquired by the image acquisition unit is determined to be the third image by a determination result of the determination unit.

According to one aspect of the present invention, when the third image with a wide dynamic range formed by compounding the first image and the second image photographed with low sensitivity or low exposure with respect to the first image, the third image having gradation of the high luminance portion suppressed with respect to gradation of the low luminance portion, is displayed in the transmissive type display panel, backlight luminance of each of segments of the backlight unit is individually controlled so that the third image is displayed as an image with a wide dynamic range, that is, the backlight unit is controlled (BLD control) so that the backlight luminance of the segment corresponding to the suppressed high luminance portion in the third image becomes higher than the backlight luminance of the segment corresponding to the low luminance portion in the third image. Accordingly, although the third image is an image with a wide dynamic range in which a high luminance portion is suppressed, luminance of the suppressed high luminance portion is to be extended, thereby enabling a photographing scene corresponding to the third image to be faithfully displayed.

The transmissive type display panel in the aspect above includes a transmissive type display panel in which backlight is used as a light source, and a hybrid type display panel in which both outside light and backlight are used as a light source.

In an image display device in accordance with another aspect of the present invention, the control unit controls the backlight unit so that each of all the segments has the same backlight luminance when the image acquired by the image acquisition unit is determined to be the fourth image by the determination result of the determination unit. Accordingly, a photographing scene corresponding to the fourth image is enabled to be faithfully reproduced and displayed.

In an image display device in accordance with further another aspect of the present invention, the image acquisition unit acquires the third image and composition information related to wide dynamic range composition, which is associated with the third image, and the determination unit determines whether the image acquired by the image acquisition unit is the third image or the fourth image on the basis of the acquired composition information, because it is impossible to determine whether the image is an image of a photographing scene with a wide dynamic range even if the image is analyzed. Thus, the composition information related to wide dynamic range composition, which is associated with the third image and is recorded, is utilized.

In an image display device in accordance with further another aspect of the present invention, the third image includes a lower luminance portion equal to or less than a predetermined threshold value, the lower luminance portion being formed by using only the first image, and a higher luminance portion exceeding the threshold value, the higher luminance portion being formed by using at least the second image, and the composition information includes the threshold value. In the third image, sufficient gradation is assigned to the low luminance portion formed by using only the first image, however, gradation is suppressed in the high luminance portion formed by using at least the second image at the time of wide dynamic range composition. The threshold value indicates a luminance value in a boundary between the low luminance portion in which gradation is not suppressed and the high luminance portion in which gradation is suppressed.

In an image display device in accordance with further another aspect of the present invention, the control unit determines a pixel with luminance exceeding the threshold value in the third image to be a pixel in the higher luminance portion on the basis of the threshold value included in the composition information.

In an image display device in accordance with further another aspect of the present invention, it is preferable that the control unit includes an extract unit configured to extract a plurality of pixels corresponding to each of segments of the backlight unit from the third image for each of the segments thereof, and if it is determined that the number of the pixels equal to or more than a predetermined ratio in the extracted plurality of pixels corresponds to the pixel in the higher luminance portion, or that an average value of luminance of the extracted plurality of pixels is a luminance value corresponding to the higher luminance portion, the control unit controls the backlight unit so that backlight luminance of the segments is increased.

Each of the pixels of the third image and the segments of the backlight unit is not in one-to-one correspondence, but the segment is larger than the pixel. Backlight luminance of the segment is determined on the basis of pixel values of a plurality of the pixels corresponding to the segment, that is, in a case where the number of pixels equal to or more than the predetermined ratio in the plurality of pixels corresponding to the segment corresponds to the pixel in the high luminance portion, or an average value of luminance of the plurality of pixels is determined as the luminance value corresponding to the high luminance portion, BLD control is performed so that the backlight luminance of the segment is increased.

In an image display device in accordance with further another aspect of the present invention, it is preferable that the control unit includes a storage unit configured to store a table or a calculation expression showing a relationship between a representative luminance value of the plurality of pixels corresponding to each of the segments of the backlight unit and the backlight luminance, and the control unit calculates corresponding backlight luminance on the basis of the representative luminance value of the plurality of pixels extracted by the extract unit and the table or the calculation expression stored in the storage unit and controls the backlight unit on the basis of the backlight luminance calculated for each of the segments of the backlight unit.

Thus, the backlight luminance of the segment is changed depending on a size of the representative luminance value of the plurality of pixels corresponding to the respective segments to increase luminance of the suppressed high luminance portion. The backlight luminance at the time is acquired by using the table or the calculation expression showing a relationship between the luminance value (representative luminance value) and the backlight luminance, stored in advance.

In an image display device in accordance with further another aspect of the present invention, it is preferable that the image acquisition unit acquires the third image and composition information that is related to wide dynamic range composition and is associated with the third image, the composition information includes information related to extension of the dynamic range of the third image, the storage unit stores a plurality of tables or calculation expressions that correspond to the extension of the dynamic range of the third image, and that increase the backlight luminance as the dynamic range becomes wider, and the control unit acquires, in accordance with the information related to the extension of the dynamic range included in the composition information, a table or a calculation expression corresponding thereto from the storage unit on the basis of the information related to the extension of the dynamic range included in the composition information, thereby calculating the backlight luminance by using the table or the calculation expression.

There are a plurality of types of images with different extension of the dynamic range (a size of suppression of the high luminance portion) in the third image that has the composition information including the information related to the extension of the dynamic range. Meanwhile, a plurality of the tables or the calculation expressions showing the relationship between the luminance value and the backlight luminance are prepared by corresponding to the extension of the dynamic range of the third image. At the time of the BLD control of the third image, the backlight luminance is to be calculated by using the table or the calculation expression corresponding to the extension of the dynamic range of the third image.

In an image display device in accordance with further another aspect of the present invention, it is preferable that the image acquisition unit acquires the third image and a gain correction table that is associated with the third image, and that corresponds to a difference between gradation conversion characteristics of the first image and those of the third image, and the control unit calculates the backlight luminance for each of the segments on the basis of the acquired gain correction table and the representative luminance value of a plurality of the pixels corresponding to each of segments of the backlight unit.

Each of the first image and the third image has different gradation conversion characteristics (such as gamma characteristics) at the time of image processing. At the time of acquiring the third image, a gain correction table corresponding to the difference between gradation conversion characteristics of the first image and those of the third image is also to be acquired. The control unit calculates the backlight luminance for each of the segments by using the third image and the acquired gain correction table on the basis of the gain correction table and the representative luminance value of the plurality of pixels corresponding to each of the segments of the backlight unit.

An image display method in accordance with further another aspect of the present invention includes: an image acquiring step of acquiring a third image formed by performing dynamic range extension processing by using a first image and a second image which is photographed with lower sensitivity or lower exposure with respect to the first image, or a fourth image without dynamic range extension processing; a display step of displaying the third image or the fourth image acquired by the image acquiring step on a transmissive type display panel; a determination step of determining whether the image acquired by the image acquiring step is the third image or the fourth image: and a controlling step of controlling a backlight unit that is provided in a back face of the transmissive type display panel, the backlight unit configured to control luminance of backlight with respect to the transmissive type display panel for each of divided segments, and in the controlling step, when the image acquired by the image acquiring step is determined to be the third image by a determination result of the determination step, the backlight unit is controlled so that the backlight luminance of the segment corresponding to the higher luminance portion suppressed by the dynamic range extension processing in the third image becomes higher than the backlight luminance of the segment corresponding to the lower luminance portion in the third image.

According to the present invention, an image (third image) in which gradation of the high luminance portion is suppressed with respect to gradation of the low luminance portion is acquired, and the BLD control is performed so that backlight luminance of a segment corresponding to the suppressed high luminance portion becomes higher than the backlight luminance of a segment corresponding to the low luminance portion when the third image is reproduced and displayed. As a result, it is possible to faithfully reproduce and display an actual photographing scene with a wide dynamic range.

BRIEF DESCRIPTION OF THE DRAWINGS

FIG. 3 is block diagram showing a digital camera that photographs and records an image including a wide DR image, and a main section of the image display device for displaying the wide DR image and the like;

DETAILED DESCRIPTION OF EXEMPLARY EMBODIMENTS

Referring to accompanying drawings, embodiments of the image display device and method in accordance with the present invention will be described.

Configuration of Image Display Device

Figure 1:
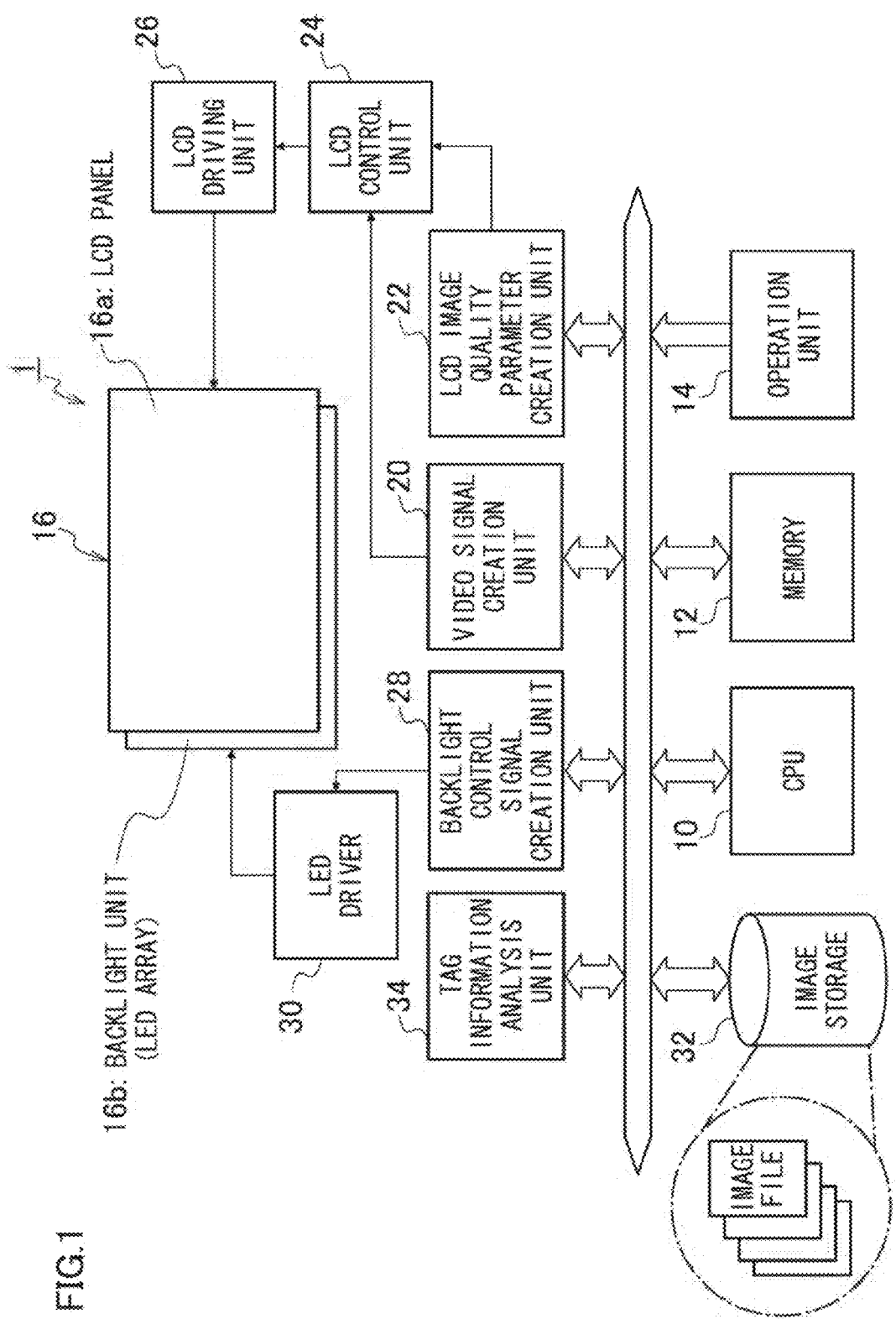
FIG. 1 is block diagram showing an embodiment of the image display device in accordance with the present invention.
Figure 2:
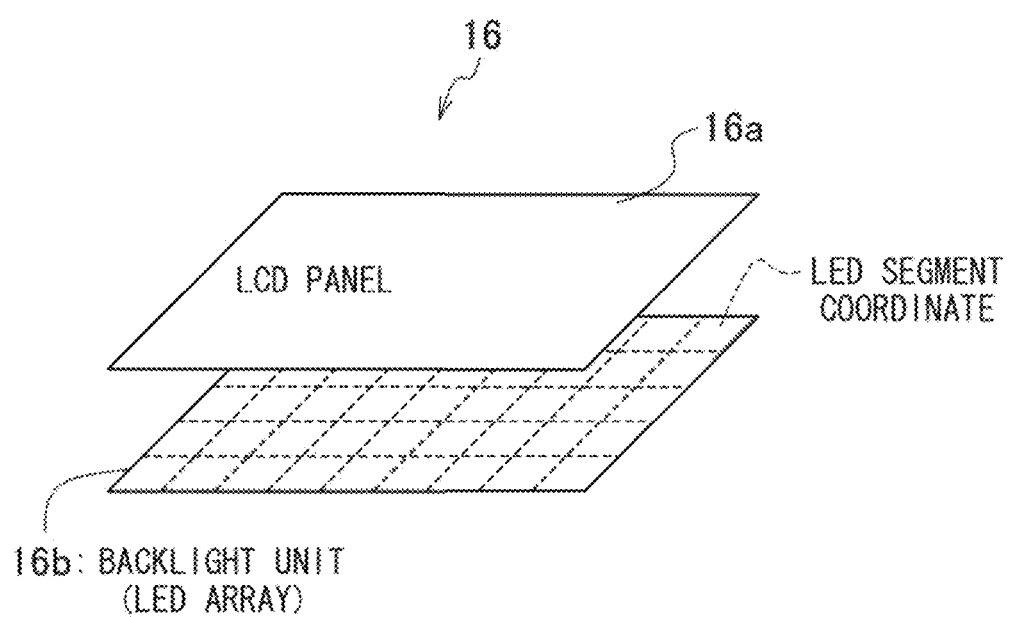
FIG. 2 is a perspective view of the liquid crystal display unit shown in FIG. 1.

FIG. 1 is a block diagram showing an embodiment of the image display device in accordance with the present invention, and FIG. 2 is a perspective view of the liquid crystal display unit shown in FIG. 1.

An image display device 1 shown in FIG. 1 is a display having a backlight local dimming (BLD) function. The image display device 1 shown in FIG. 1 includes: a central processing unit (CPU) 10; a memory 12; an operation unit 14; a liquid crystal display (LCD) 16 (LCD panel 16a (transmissive display panel); a backlight unit (LED array) 16b); a video signal creation unit 20; an LCD image quality parameter creation unit 22; an LCD control unit 24; an LCD driving unit 26; a backlight control signal creation unit 28 (control unit and extract unit); a light emission diode (LED); a driver 30; an image storage 32; and a tag information analysis unit 34.

The CPU 10 performs integrated control of an overall operation of the image display device on the basis of input from the operation unit 14, in accordance with a predetermined control program. The CPU 10 includes an image acquisition function of acquiring an image file stored in the image storage 32, and extending compression image data (image data to which Joint Photographic Experts Group (JPEG) compression is applied, for example) stored in the image file to acquire the extended image data.

The memory 12 includes a Synchronous Dynamic Random Access Memory (SDRAM) serving as a volatile memory, an Electrically Erasable and Programmable Read-Only Memory (EEPROM) of a storage unit, serving as a rewritable nonvolatile memory, and the like. The SDRAM is used as a work area when the CPU 10 executes a control program, and as a storage area in which image data to be reproduced is temporarily stored. On the other hand, in the EEPROM, programs including a BLD control program, a table or a calculation expression to be used for BLD control, various parameters, and the like are stored.

The LCD display unit 16 includes a transmissive LCD panel 16a and a backlight unit 16b. The backlight unit 16b is provided in a back face of the LCD panel 16a as shown in FIG. 2, and is composed of LED array in which one LED is arranged for each of the divided LED segments. The backlight unit 16b is capable of controlling light emission luminance (backlight luminance) for each of the LED segments, that is, the BLD control of individually controlling backlight luminance for each of the LED segments is applied to the backlight unit 16b. The LED segment usually includes horizontal 200 pixels and about vertical 200 pixels per one segment.

The LCD display unit 16 in accordance with the present invention is not limited to a transmissive type display panel. It is also possible to use a hybrid type display panel (liquid crystal panel) in which both reflection of outside light and backlight are used as a light source, for example, as the LCD display unit 16.

The video signal creation unit 20 converts image data temporarily stored in the memory 12 into video signals to display the image data in the LCD panel 16a, and applies gamma correction (inverse gamma correction) corresponding to gamma characteristics of the LCD display unit 16 to the video signals to output the video signals to the LCD control unit 24. Another input of parameters (such as brightness) for adjusting image quality is inputted to the LCD control unit 24 from the LCD image quality parameter creation unit 22. The LCD control unit 24 controls the LCD driving unit 26 on the basis of video signals and parameters received from the video signal creation unit 20. The LCD driving unit 26 drives the LCD panel 16a by using control signals corresponding to the video signals supplied from the LCD control unit 24 to control transmittance for each of LCD elements (display elements).

The backlight control signal creation unit 28 has a function of extracting a plurality of pixels corresponding to each of the LED segments of the backlight unit 16b (extract unit), a function of controlling the backlight local dimming (BLD) (control unit), and the like. The backlight control signal creation unit 28 creates backlight control signals for controlling luminance of each of the LED segments on the basis of an image to be reproduced and displayed in the LCD display unit 16, and tag information to be extracted by the tag information analysis unit 34. Details of the backlight control signal creation unit 28 will be described later.

The LED driver 30 individually drives the LED segments of the backlight unit 16b by using backlight control signals supplied from the backlight control signal creation unit 28 to allow each of the LED segments to emit backlight to which the BLD control is applied.

The image storage 32 is composed of a hard disk device, and the like, for example, to store an image file of a still picture or a moving image, to be displayed in the LCD display unit 16. The image storage 32 is not limited to that built in the image display device 1, but an external recording medium that is to be connected to the image display device 1 through an interface and is detachable (such as a memory card) may be available.

The tag information analysis unit 34 reads out tag information from a header of an image file for display read out from the image storage 32 to extract wide dynamic range (wide DR) composition information and the like included in the tag information. The tag information analysis unit 34 then outputs the extracted wide DR composition information and the like to the backlight control signal creation unit 28.

[Wide DR Image]

Next, a wide DR image, to which the image display method in accordance with the present invention is applied, will be described.

Figure 3:
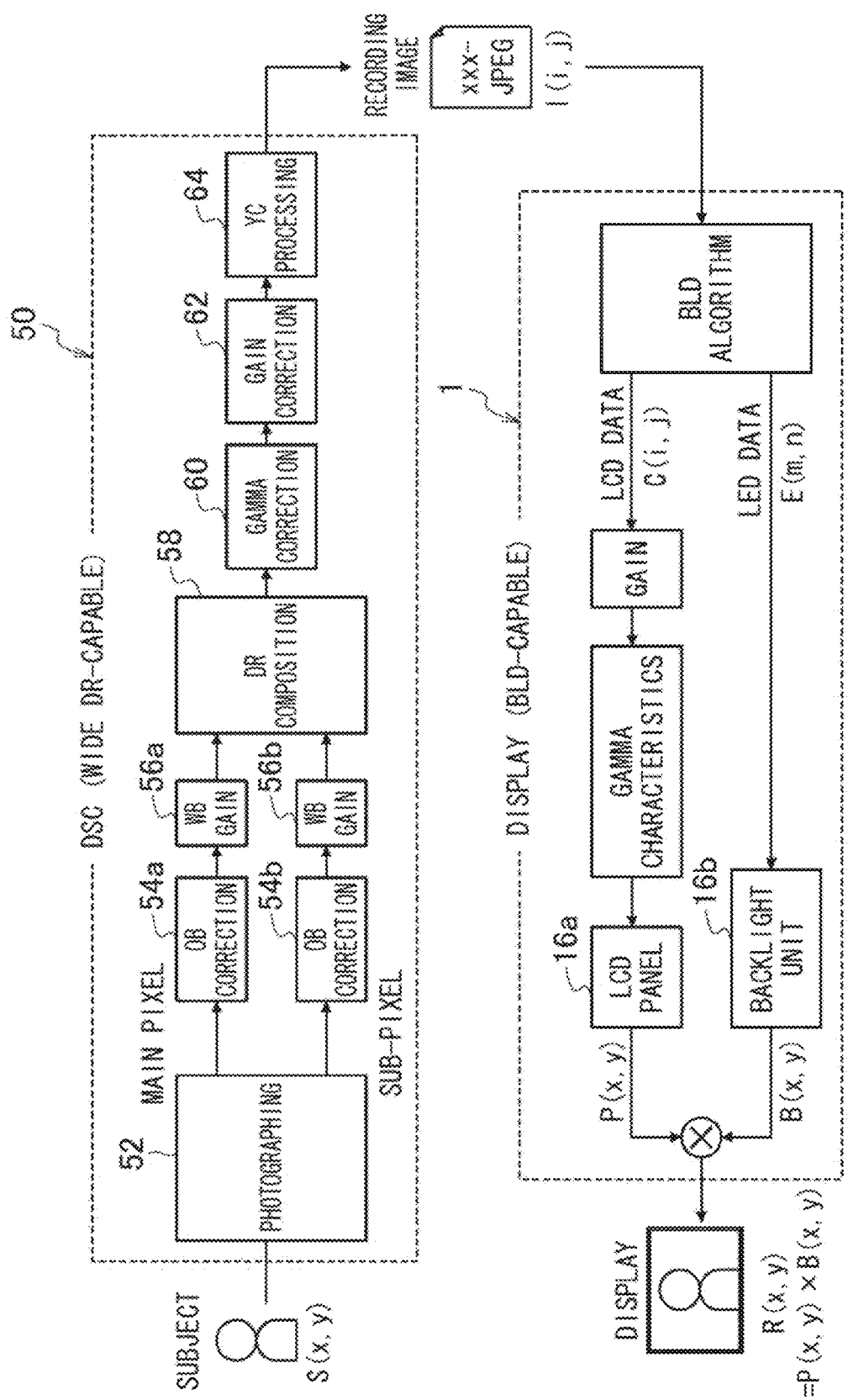

FIG. 3 is block diagram showing a digital camera 50 that photographs and records an image including a wide DR image, and a main section of the image display device 1 for displaying the wide DR image and the like.

In FIG. 3, the digital camera 50 has a photographing unit 52 provided with an imaging element that has two types of photodiode groups with different sensitivity, or two types of photodiode groups with the same sensitivity, in which exposure time can be individually controlled. The photographing unit 52 includes a pixel with high sensitivity (hereinafter referred to as a "main pixel") and a pixel with low sensitivity (hereinafter referred to as a "sub-pixel"), at the time of wide DR photographing, and simultaneously outputs image data received from the main pixel and the sub-pixel. An image (high-sensitivity image) composed of the main pixels is an image having standard (normal) brightness, and an image (low-sensitivity image) composed of the sub-pixels is an image with underexposure. A low-sensitivity image is an image acquired by a photodiode group with low sensitivity in a case of an imaging element having two types of photodiode groups with different sensitivity, and is an image acquired by a photodiode group in which exposure time is shorter than exposure time to acquire an image having standard brightness in a case of an imaging element having two photodiode groups having the same sensitivity.

Image data of main pixels and that of pixels output from a photographing unit 52 are added to a dynamic range (DR) composition unit 58 after signal components of an optical black (OB) area are removed by optical black (OB) correction units 54a and 54b, respectively, and white balance correction is applied to the image data of the main pixels and that of the sub-pixels by white balance (WB) gain correction units 56a and 56b, respectively.

Figure 4:
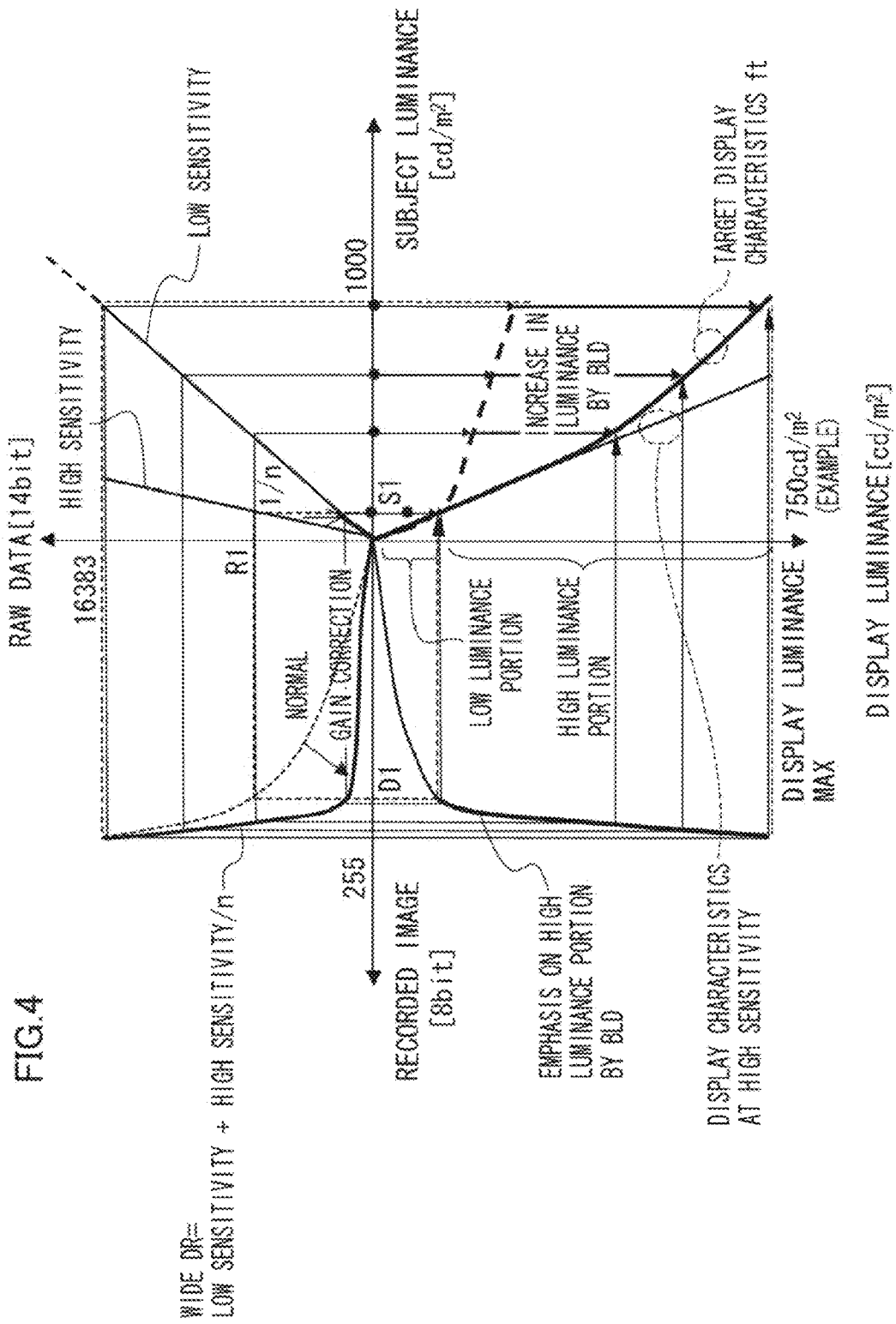
FIG. 4 is a graph showing photographing characteristics, image processing characteristics, display characteristics, and reproduction characteristics in accordance with the present invention.

As shown in FIG. 4, each of RAW data of a high-sensitivity image and that of a low-sensitivity image supplied to the DR synthetic unit 58 is 14-bit data (0 to 16383). A sensitivity ratio of the high-sensitivity image and the low-sensitivity image is indicated as n:1 (n>1). Thus, the low-sensitivity image has a sensitivity ratio of 1/n with respect to the high-sensitivity image.

In a case where wide DR composition is applied to the high-sensitivity image and the low-sensitivity image, as shown in a first quadrant of FIG. 4, the high-sensitivity image is compressed to 1/n, and with respect to a predetermined threshold value S1 that shows a boundary between a low luminance portion and a high luminance portion, a pixel having luminance equal to or less than the threshold value S1 uses a pixel of the high sensitivity image, and a pixel exceeding the threshold value S1 uses a pixel of the low-sensitivity image, and then these pixels are compounded. For a pixel exceeding the threshold value S1 up to saturation of the high-sensitivity image, the pixel of the high-sensitivity image and the pixel of the low-sensitivity image may be mixed at a proper ratio. In addition, the high-sensitivity image is compressed to 1/n, so that noise components also can be compressed to 1/n, whereby it is possible to achieve high picture quality compared with a case of using only the low-sensitivity image.

Returning to FIG. 3, a gamma correction unit 60 applies gamma correction to the wide DR image compounded by the DR composition unit 58. The gamma correction unit 60 applies the same gamma correction as that for a normal image (high-sensitivity image), and applies gamma correction having characteristics shown in a second quadrant of FIG. 4 by broken lines. In addition, the image is converted from 14-bit data into 8-bit data (0 to 255) at the time of the gamma correction.

A gain correction unit 62 subsequently applies gain correction to the wide DR image to which the gamma correction is applied by the gamma correction unit 60. The wide DR image has a sensitivity of 1/n of that of a normal image as described earlier, so that a low-sensitivity portion becomes dark. As shown in the second quadrant of FIG. 4 by solid lines, the gain correction unit 62 performs the gain correction so that a half tone including a low-sensitivity portion of the wide DR image increases. Thus, in a case where a value to which a value R1 of the high-sensitivity image corresponding to the threshold value S1 is changed after the gamma correction is indicated as D1, the gain correction is performed so that a value of the wide DR image after the gamma correction and the gain correction becomes D1.

As shown in the second quadrant of FIG. 4 by solid lines, in the wide DR image, it is perceived that gradation of a high luminance portion is suppressed as compared with gradation of a low luminance portion.

After a demosaic processing unit (synchronization processing unit) (not shown) applies demosaic processing (synchronization processing) to the wide DR image after the gain correction applied by the gain correction unit 62, a YC processing unit 64 converts the wide DR image into a luminance signal Y and color difference signals Cr and Cb, and compresses the signals in accordance with a JPEG method, and then the signals are recorded in a recording medium (not shown) and the like of the digital camera 50.

Although the digital camera 50 shown in FIG. 3 has the gamma correction unit 60 and the gain correction unit 62, one correction unit may perform these gradation conversion processing.

[BLD Control]

Next, the BLD control of the image display device 1 in accordance with the present invention is described.

In FIG. 3, when a wide DR image photographed as above is acquired, LCD data C (i,j) is created on the basis of the wide DR image, as well as LED data E (m,n) (backlight control signals) is created in accordance with BLD algorithm of the backlight control signal creation unit 28. Gain correction, inverse gamma correction by gamma characteristics of the LCD display unit 16, and the like, are applied to the LCD data C(i,j) so that the LCD data C(i,j) is supplied to the LCD panel 16a. Accordingly, each of display elements of the LCD panel 16a is controlled so as to have transmittance corresponding to the wide DR image.

In addition, light emission luminance of each of LED segments of the backlight unit 16b is controlled by the LED data E(m,n).

The BLD control is applied to a LED segment in which a pixel having luminance equal to or less than a threshold value D1 shown in the second quadrant of FIG. 4 is displayed, for example, so that the pixel has normal luminance. Accordingly, only inverse gamma characteristics of the LCD display unit 16 (characteristics equal to or less than D1 in a third quadrant) are applied to the low luminance portion of the wide DR image. As a result, an image in the low luminance portion equal to or less than the threshold value S1 is displayed as an image with brightness in proportion to subject luminance, as shown in a fourth quadrant.

On the other hand, the BLD control is applied to a LED segment in which a pixel having luminance exceeding the threshold value D1 shown in the second quadrant of FIG. 4 is displayed so that the pixel has luminance higher than normal backlight luminance. As a result, it is possible to extend a high luminance portion of a wide DR image in which gradation of the high luminance portion is suppressed in a recorded image, thereby enabling a photographing scene with wide DR to be more faithfully reproduced and displayed. In a case where a maximum value of display luminance of a normal image is 250 cd/m², for example, if a maximum value of display luminance of the wide DR image is set at 750 cd/m², it is possible to display the wide DR image by increasing the DR three times.

As shown in the fourth quadrant of FIG. 4, the high luminance portion as well as the low luminance portion may be allowed to linearly vary in proportion to subject luminance. In a case where a maximum value of display luminance is limited, the high luminance portion may be allowed to vary along a polygonal line or a curve so that the maximum value of display luminance corresponds with a maximum value of the subject luminance.

Figure 5A:
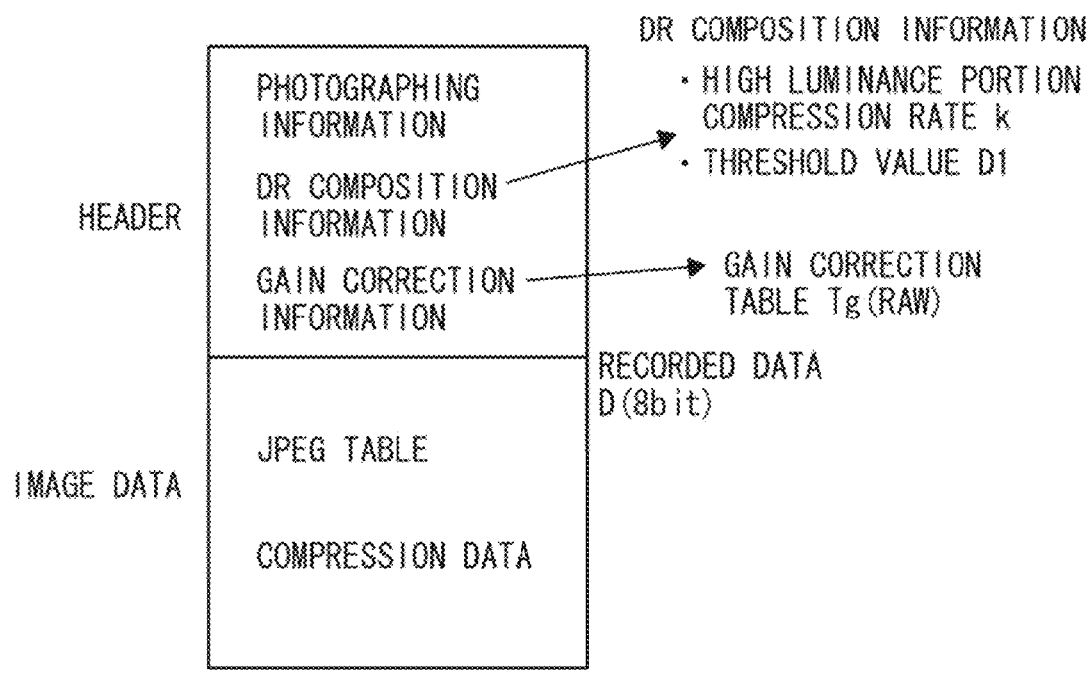
FIG. 5A shows an example of tag information recorded in a header of an image file storing the wide DR image.

Figure 5A shows an example of tag information recorded in a header of an image file storing the wide DR image.

The digital camera 50 records the DR composition information and the gain correction information in addition to normal photographing information as the tag information at the time of photographing a wide DR image, as shown in FIG. 5A.

The DR composition information includes a high luminance portion compression rate k (a sensitivity ratio of a high-sensitivity image and a low-sensitivity image), and the threshold value D1 (the threshold value D1 shown in the second quadrant of FIG. 4) showing a boundary between the low luminance portion and the high luminance portion of the wide DR image. The high luminance portion compression rate k allows extent of suppression of the high luminance portion of the wide DR image to be detected. In addition, the threshold value D1 allows the low luminance portion and the high luminance portion of the wide DR image to be discriminated.

Figure 5B:
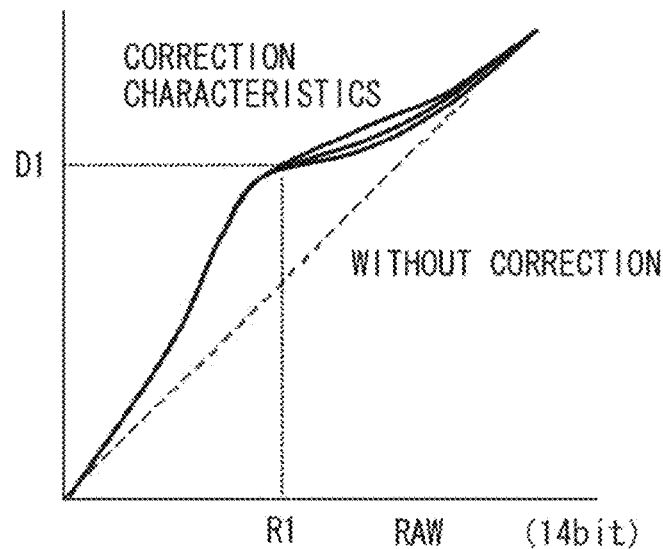
FIG. 5B shows an example of gain correction information in the tag information recorded in the header of the image file storing the wide DR image.

The gain correction information shows a gain correction table Tg that shows what gain correction is applied to the wide DR image, as shown in FIG. 5B. The gain correction table Tg is a correction table corresponding to a difference between a normal image (high sensitivity image) and the wide DR image in gradation conversion characteristics (such as gamma characteristics) at the time of image processing (refer to the second quadrant of FIG. 4).

Figure 6:
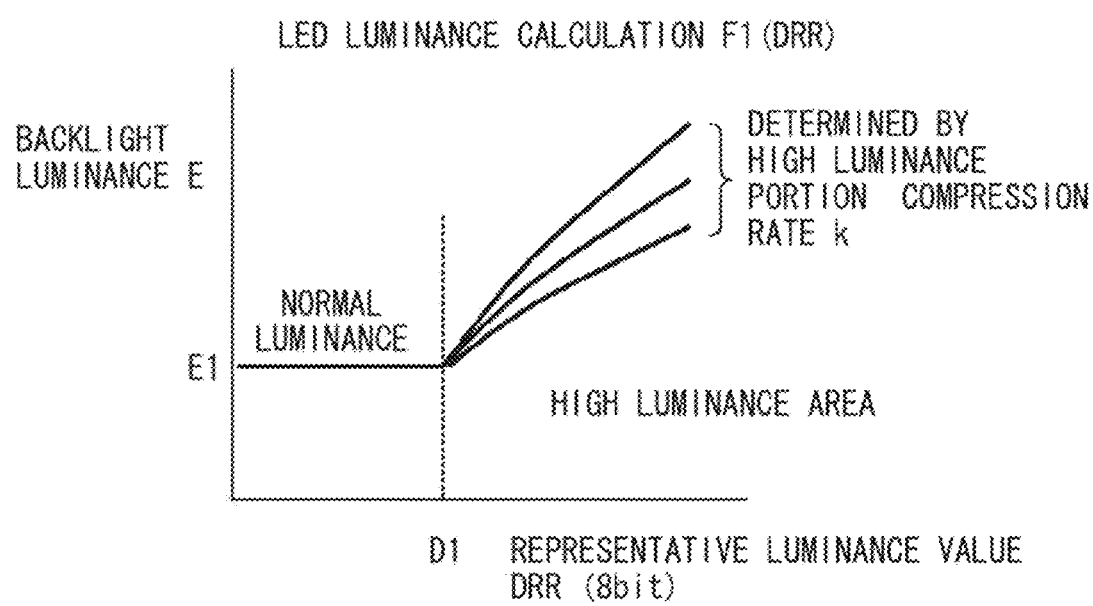
FIG. 6 is a graph showing a relationship between image data and backlight luminance.

The tag information analysis unit 34 shown in FIG. 1 extracts the DR composition information and the gain correction information above from the header of the image file, and supplies the information to the backlight control signal creation unit 28. The backlight control signal creation unit 28 creates a backlight control signal of allowing a LED segment to become normal luminance E1 for a LED segment corresponding to a representative luminance value DRR (Data Reproduced and Representing the segment) equal to or less than the threshold value D1 in a plurality of representative luminance values DRR of image data for the respective LED segments of the wide DR image, as shown in FIG. 6. For a LED segment corresponding to a representative luminance value DRR exceeding the threshold value D1, the backlight control signal creation unit 28 creates a backlight control signal (LED data) of increasing backlight luminance in accordance with a value of the representative luminance value DRR.

FIG. 6 shows three different graphs of characteristics of backlight luminance E with respect to a representative luminance value DRR exceeding the threshold value D1. The backlight control signal creation unit 28 determines any one of the graphs of the input-output characteristics by using the high luminance portion compression rate k included in the DR composition information. As the high luminance portion compression rate k increases, the high luminance portion of the wide DR image is more suppressed, thereby determining a graph showing a line inclined at a large angle.

In the EEPROM of the memory 12, a plurality of tables corresponding to the graph shown in FIG. 6 are stored. The backlight control signal creation unit 28 creates a backlight control signal for each of the LED segments on the basis of a table determined from among a plurality of tables on the basis of the high luminance portion compression rate k, and the representative luminance value DRR corresponding to the LED segment of the wide DR image.

In addition, the backlight control signal may be created for each of the LED segments on the basis of the gain correction table Tg stored in the header (corresponding to any one of a plurality of tables above) and image data of the wide DR image. Further, a calculation expression may be stored instead of the table corresponding to the graphs shown in FIG. 6.

[Image Display Method]

Next, an embodiment of the image display method in accordance with the present invention will be described.

Figure 7:
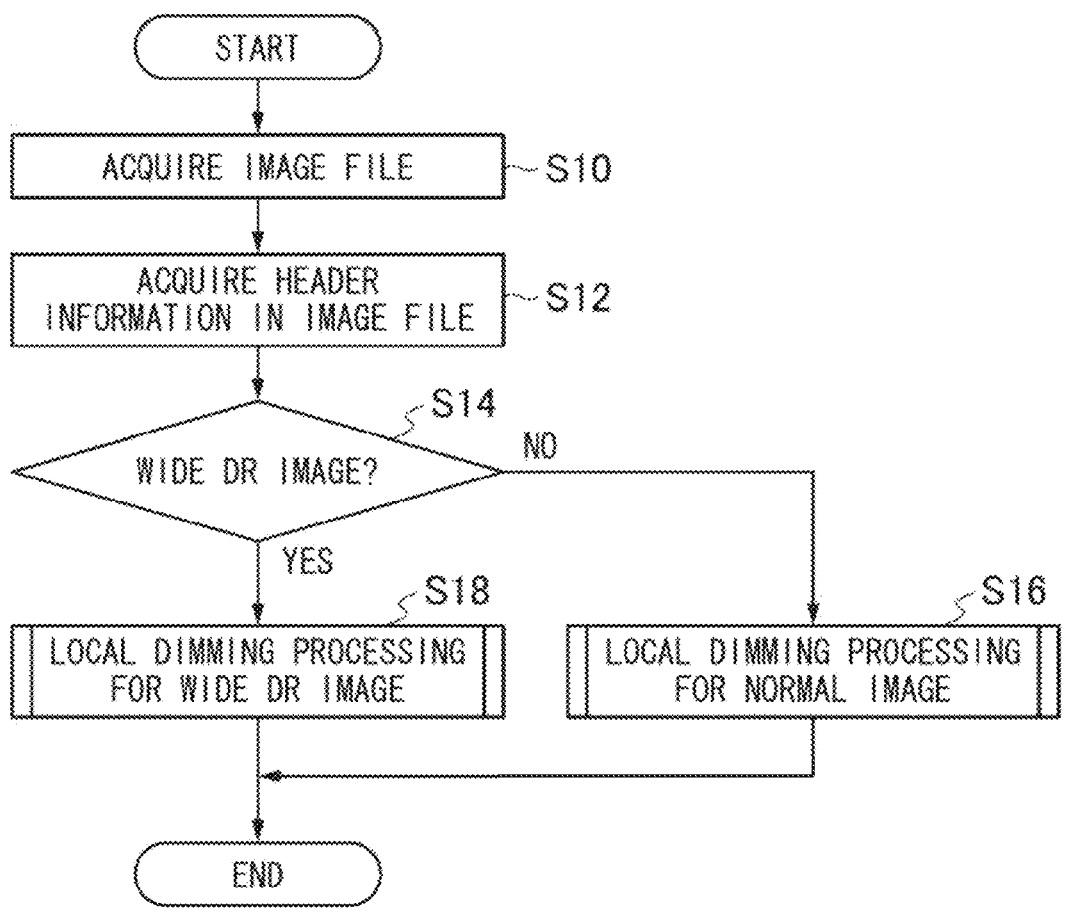
FIG. 7 is a flow chart showing an overall flow of the image display method in accordance with an embodiment of the present invention.

FIG. 7 is a flow chart showing an overall flow of the image display method in accordance with an embodiment of the present invention.

In FIG. 7, a desired image file is selected by the operation unit 14, and the image file to be reproduced and displayed is acquired from the image storage 32 (step S10). The tag information analysis unit 34 acquires header information of the acquired image file (step S12). If the header information includes DR composition information for the wide DR image, the DR composition information is outputted to the backlight control signal creation unit 28.

The backlight control signal creation unit 28 determines whether an image in the acquired image file is a wide DR image or a normal image on the basis of whether the DR composition information is received from the tag information analysis unit 34 or not (step S14). If the backlight control signal creation unit 28 determines that the image is a normal image (in a case of "No"), BLD processing for a normal image of the step S16 is performed (step S16). On the other hand, if determining that the image is a wide DR image (in a case of "Yes"), the backlight control signal creation unit 28 performs BLD processing for a wide DR image (step S18).

In the BLD processing for a normal image, the backlight unit 16b is controlled so that each of all the segments of the backlight unit 16b has the same backlight luminance (the backlight luminance E1 shown in FIG. 6).

Figure 8:
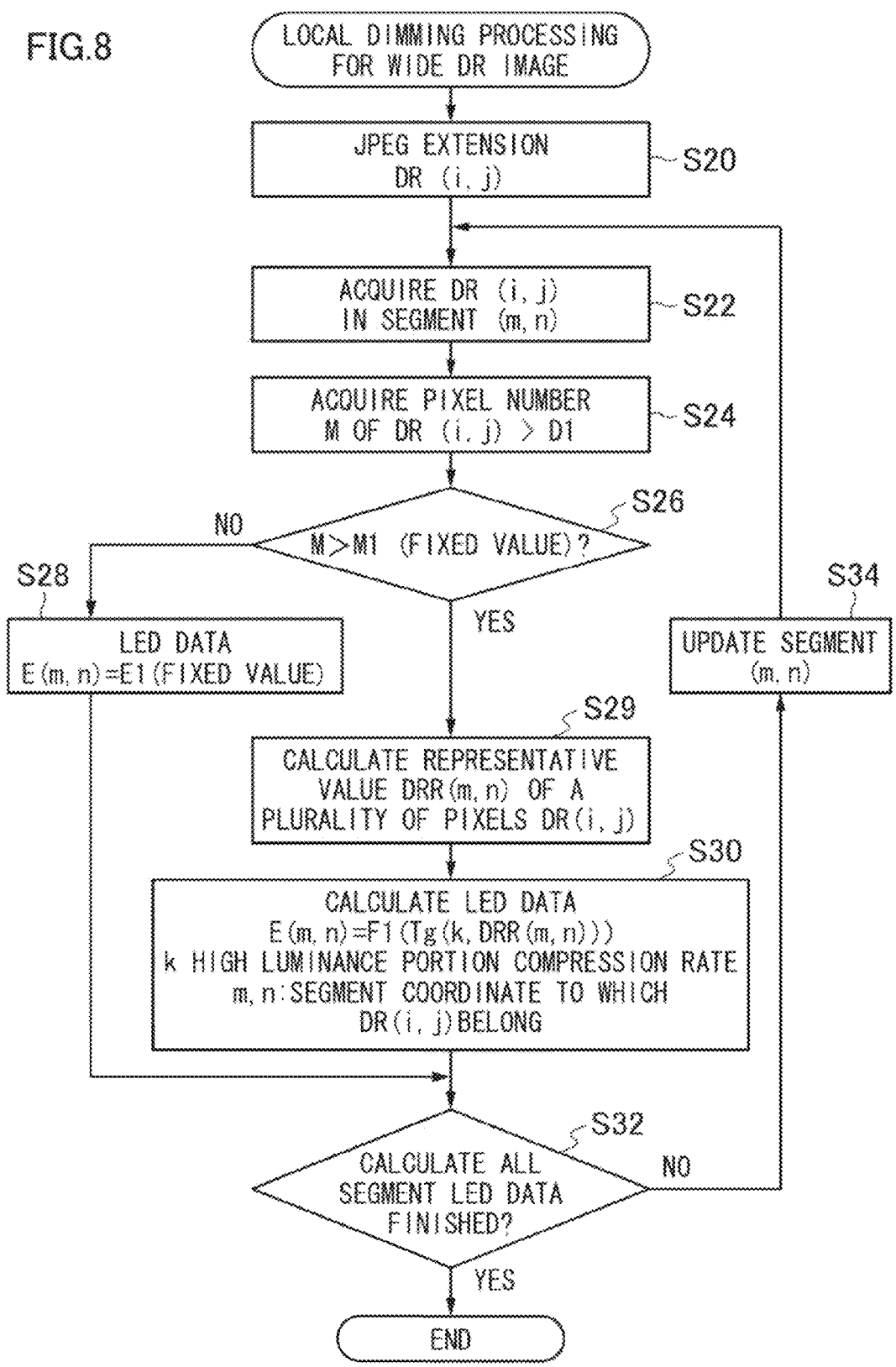
FIG. 8 is a flow chart showing BLD processing for a wide DR image.

On the other hand, in the BLD processing for a wide DR image, control of the backlight unit 16b is performed based on the flow chart shown in FIG. 8.

The BLD processing for a wide DRi mage will be described in accordance with the flow chart shown in FIG. 8.

First, JPEG extension is applied to the wide DR image in the acquired image file (step S20), where each of pixels of the wide DR image extended by the JPEG extension is indicated as DR (i,j).

Next, a LED segment (m,n) is determined, and a plurality of pixels DR (i,j) in the LED segment (m,n) are acquired (step S22), where the (m,n) indicates a coordinate of the LED segment (refer to FIG. 2).

Thus, the pixels DR (i,j) and the LED segments (m,n) are not in one-to-one correspondence, but the LED segments (m,n) are larger than the pixels DR (i,j). When backlight luminance of the LED segments (m,n) is determined, it is necessary to determine the backlight luminance on the basis of a pixel value of a plurality of pixels DR (i,j) corresponding to in the LED segments (m,n).

Next, a pixel number M exceeding the threshold value D1 (refer to FIG. 6) in a plurality of pixels DR (i,j) in the LED segment (m,n) is acquired (step S24). Then, it is determined whether the acquired pixel number M exceeds a predetermined value M1 (fixed value) (step S26). The M1 indicates a value of 70% of a pixel number in one LED segment (m,n), for example. An average value of the plurality of pixels DR (i,j) may be acquired to determine whether the average value exceeds the threshold value D1.

If the pixel number M does not exceed the M1 (in a case of "No"), processing is transferred to a step S28. On the other hand, if the pixel number M exceeds the M1 (in a case of "Yes"), the processing is transferred to a step S29.

In the step S28, LED data E (m,n) of the LED segment (m,n) is set as the normal luminance E1 (refer to FIG. 6).

On the other hand, in the step S29, a representative luminance value DRR (m,n) of the plurality of pixels DR (i,j) in the LED segment (m,n) is calculated. A maximum value, an average value, or the like of the plurality of pixels DR (i,j) is applicable to the representative luminance value of the plurality of pixels DR (i,j).

Subsequently, in a step S30, the LED data E (m,n) of the LED segment (m,n) is calculated on the basis of the gain correction table Tg, the representative luminance value DRR (m,n), and the high luminance portion compression rate k, by using the following expression.

$$E(m,n)=F1(Tg(k,DRR(m,n)))$$ [Expression 1]

The calculation processing of the LED data E (m,n) is not limited to the processing performed by using Expression 1 above. FIG. 6 shows the plurality of graphs showing a relationship between the high luminance portion and the backlight luminance, for example. Thus, a table or a calculation expression to be used may be determined from among a plurality of tables or calculation expressions corresponding to the graphs by using the high luminance portion compression rate k, in order to calculate the LED data E (m,n) on the basis of the determined table or calculation expression, and the representative luminance value DRR (m,n) of the plurality of pixels DR (i,j).

Subsequently, it is determined whether calculation of LED data of all the segments is finished or not (step S32). If the calculation is not finished (in a case of "No"), a coordinate of the LED segment is updated (step S34), and then the processing is transferred to the step S22 to repeat the processing from the step S22 above to the step S32. On the other hand, if the calculation of LED data of all the segments is finished (in a case of "Yes"), the calculation processing of the LED data in the BLD processing for the wide DR image is finished.

Backlight luminance E of the LED segments(m,n) is controlled by using the LED data E (m,n) calculated as above, so that it is possible to increase luminance of the suppressed high luminance portion in the wide DR image, thereby enabling an actual photographing scene to be faithfully reproduced and displayed.

Figure 9:
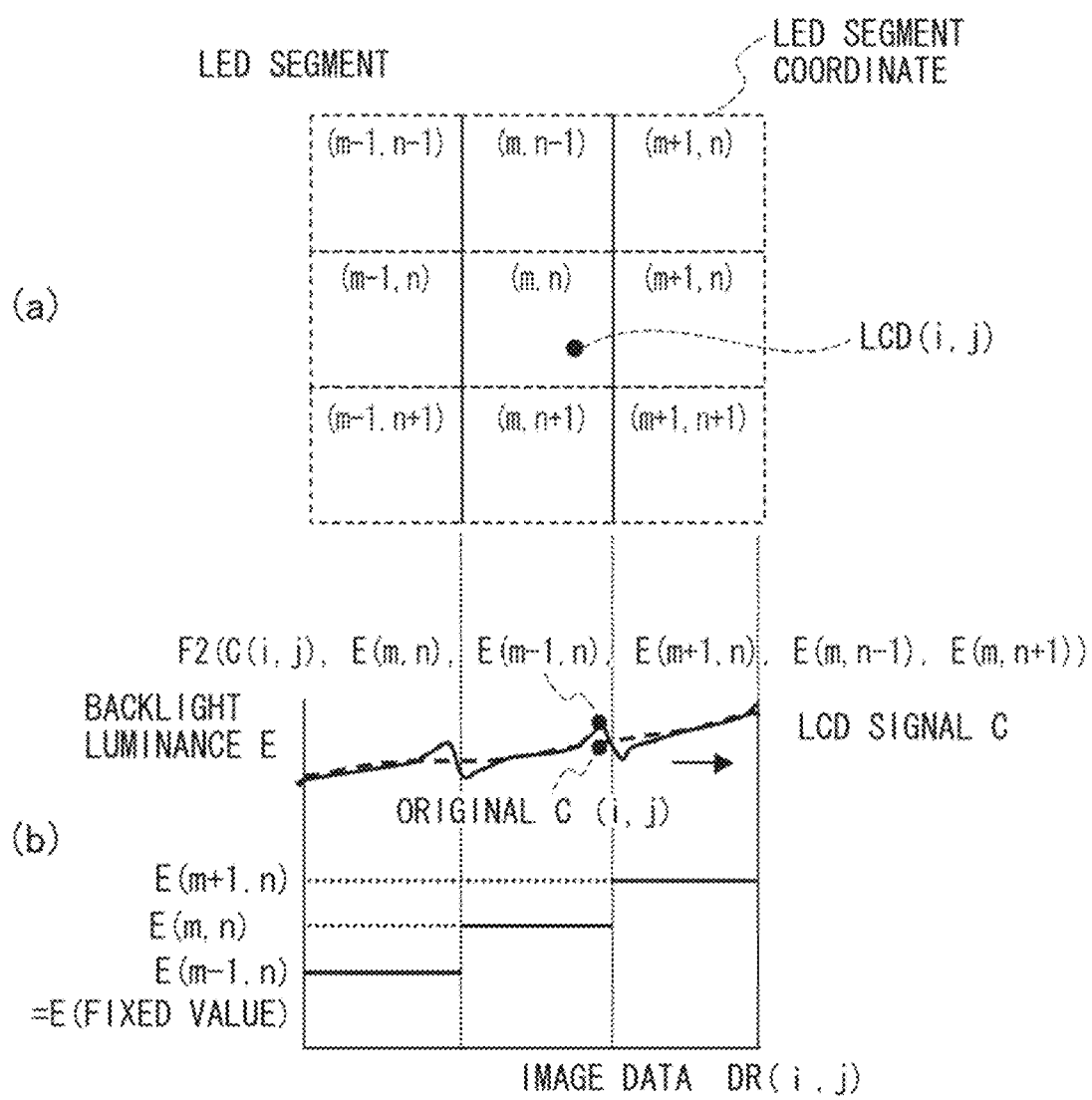
FIG. 9 conceptually shows an adjustment method of adjusting LCD data by controlling backlight luminance of a LED segment.

FIG. 9 conceptually shows an adjustment method of adjusting LCD data (i,j) by controlling backlight luminance E of a LED segment (m,n).

As shown in a portion (a) in FIG. 9, in a LED segment for which the backlight luminance E is controlled, the predetermined number of LEDs mounted in the segment emits light. If LED segments adjacent to each other differ greatly in LED luminance, a difference in luminance may be seen between the LED segments. In order to prevent the difference, the LCD data C (i,j) for a display element belonging to each of the LED segments is changed near the boundary between the segments to reduce the difference in luminance.

As shown in a portion (b) in FIG. 9, for example, if there are differences among backlight luminance E (m+1,n), E (m,n), and E (m-1,n) of LED segments (m+1,n), (m,n), and (m-1,n), original LCD data C (i,j) shown by a broken line is changed so as to be LCD data C (i,j) shown by a solid line, that is, the original LCD data C (i,j) is changed to data shown by the following expression on the basis of backlight luminance E (m,n) of a pixel D (i,j) and a LED segment (m,n) to which the pixel D (i,j) belongs, and up and down, left and right backlight luminance E (m,n−1), E (m,n+1), E (m−1,n), and E (m+1,n).

$$C(i,j)=F2\{(D(i,j),E(m,n),E(m-1,n),E(m+1,n),E(m,n-1),E(m,n+1)\}$$ [Expression 2]

Figure 10:
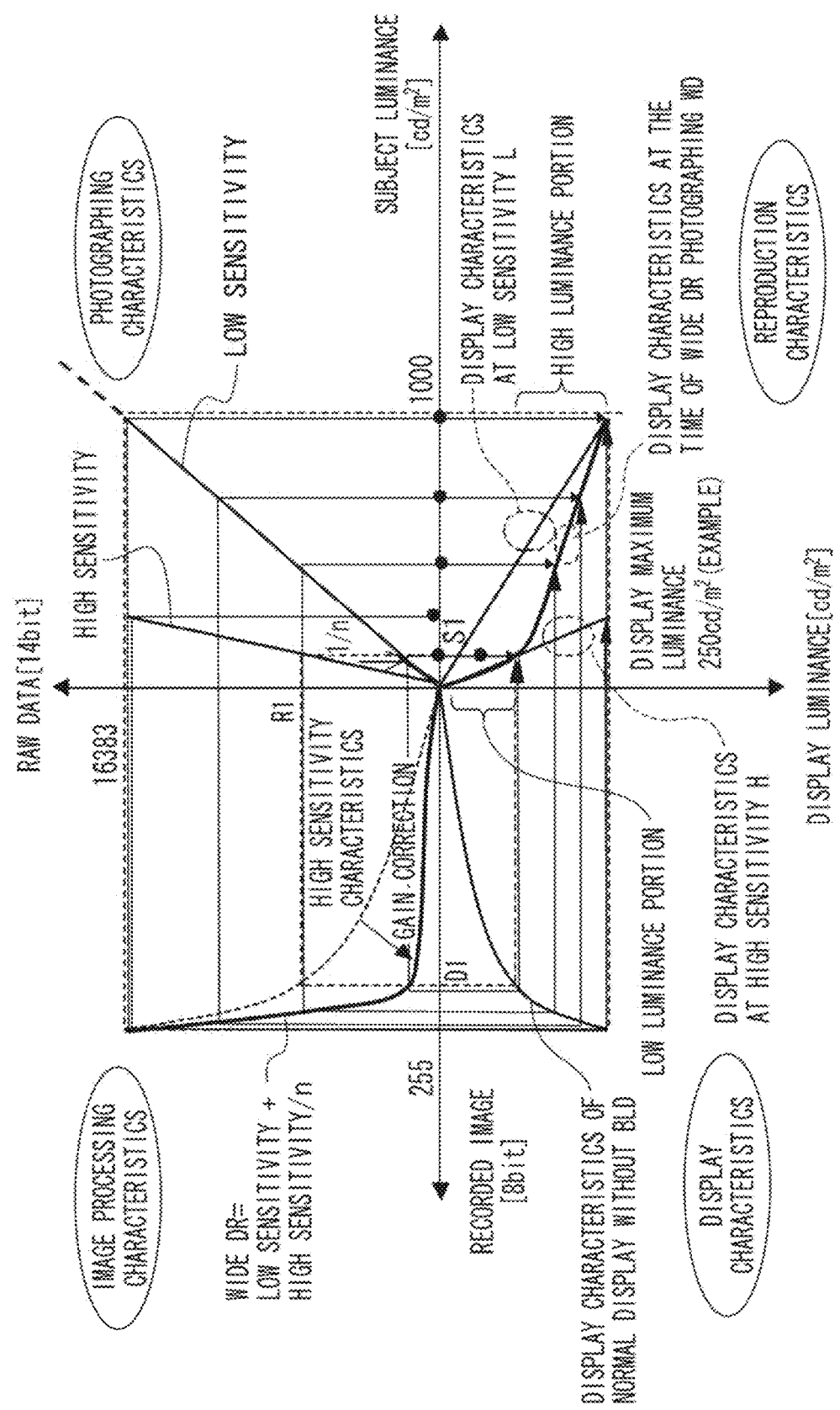
FIG. 10 is a graph showing conventional photographing characteristics, image processing characteristics, display characteristics, and reproduction characteristics.

FIG. 10 shows reproduction characteristics in a case where the BLD control is not performed for a wide DR image. As shown in the fourth quadrant of FIG. 10, although gradation is assigned to the high luminance portion, the gradation is suppressed as compared with gradation of the low luminance portion, whereby the gradation becomes low contrast to result in so-called a dull picture.

In contrast, in the present invention, as shown FIG. 4, luminance suppressed by the BLD control in the high luminance portion is extended to allow gradation of the high luminance portion to become high contrast, thereby enabling a photographing scene with a wide DR to be more faithfully reproduced and displayed.

Figure 11:
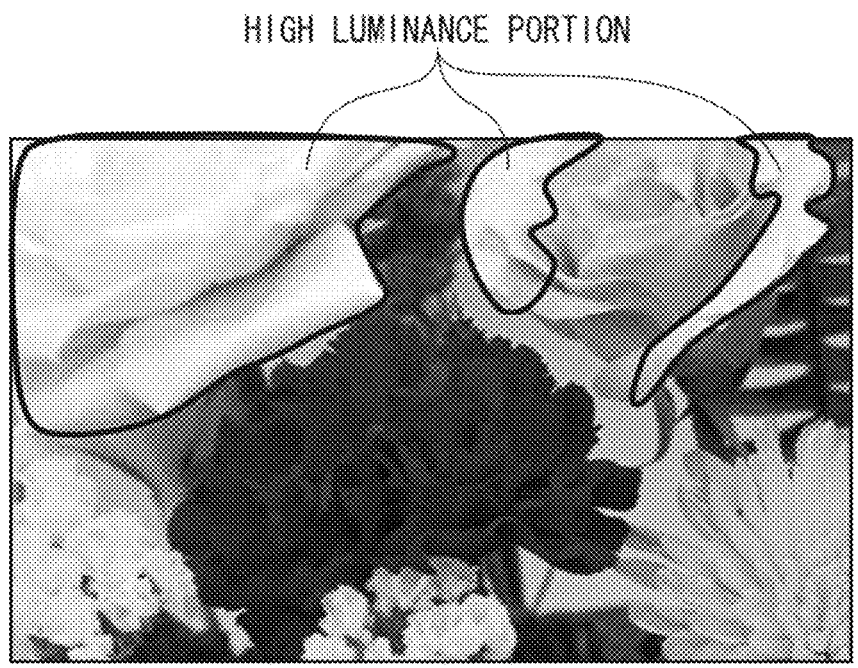
FIG. 11 is an image showing an example of the wide DR image.

FIG. 11 is an image showing an example of the wide DR image, and an upper portion thereof includes high luminance portions. The present invention enables gradation of the high luminance portions to become high contrast, thereby enabling rich gradation expression to be achieved. There is less gradation assigned to the high luminance portion of the wide DR image, but contrast is emphasized in the high luminance portion. As a result, change in luminance increases, however, it is difficult to detect the change in luminance in the high luminance portion, so that there is little influence on image quality.

On the other hand, since a low luminance portion of the wide DR image is irradiated with light having steady fixed luminance, a problem in which contrast is unnecessarily emphasized to form an unnatural image, and the like, do not occur, thereby enabling favorable image quality to be provided.

As another embodiment of an image display device 1, a cellular phone, a smartphone, a personal digital assistant (PDA), and a portable type game machine, for example, are listed. Hereinafter, a smartphone will be described in detail as an example with reference to drawings.

[Configuration of Smartphone]

Figure 12:
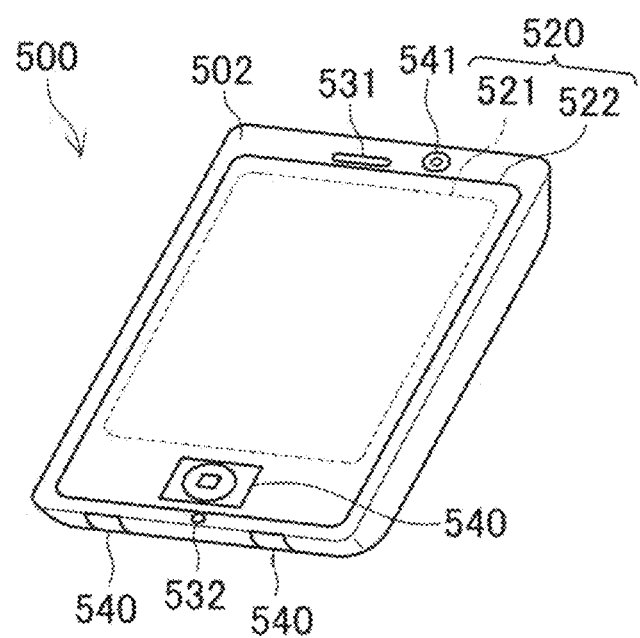
FIG. 12 is a perspective view showing an appearance of a smartphone of another embodiment of the present invention.

FIG. 12 is a perspective view showing an appearance of a smartphone 500 of another embodiment of the image display device 1.

The smartphone 500 shown in FIG. 12 has a tabular body 502 that is provided in its one face with a display-input unit 520 into which a display panel 521 serving as a display and an operation panel 522 serving as an input section are integrated. In addition, the body 502 includes a speaker 531, a microphone 532, an operation unit 540, and a camera unit 541. A configuration of the body 502 is not limited to the above, therefore, it is possible to apply a configuration in which a display and an input section are separated, a foldable structure, or a configuration having a slide mechanism, for example.

Figure 13:
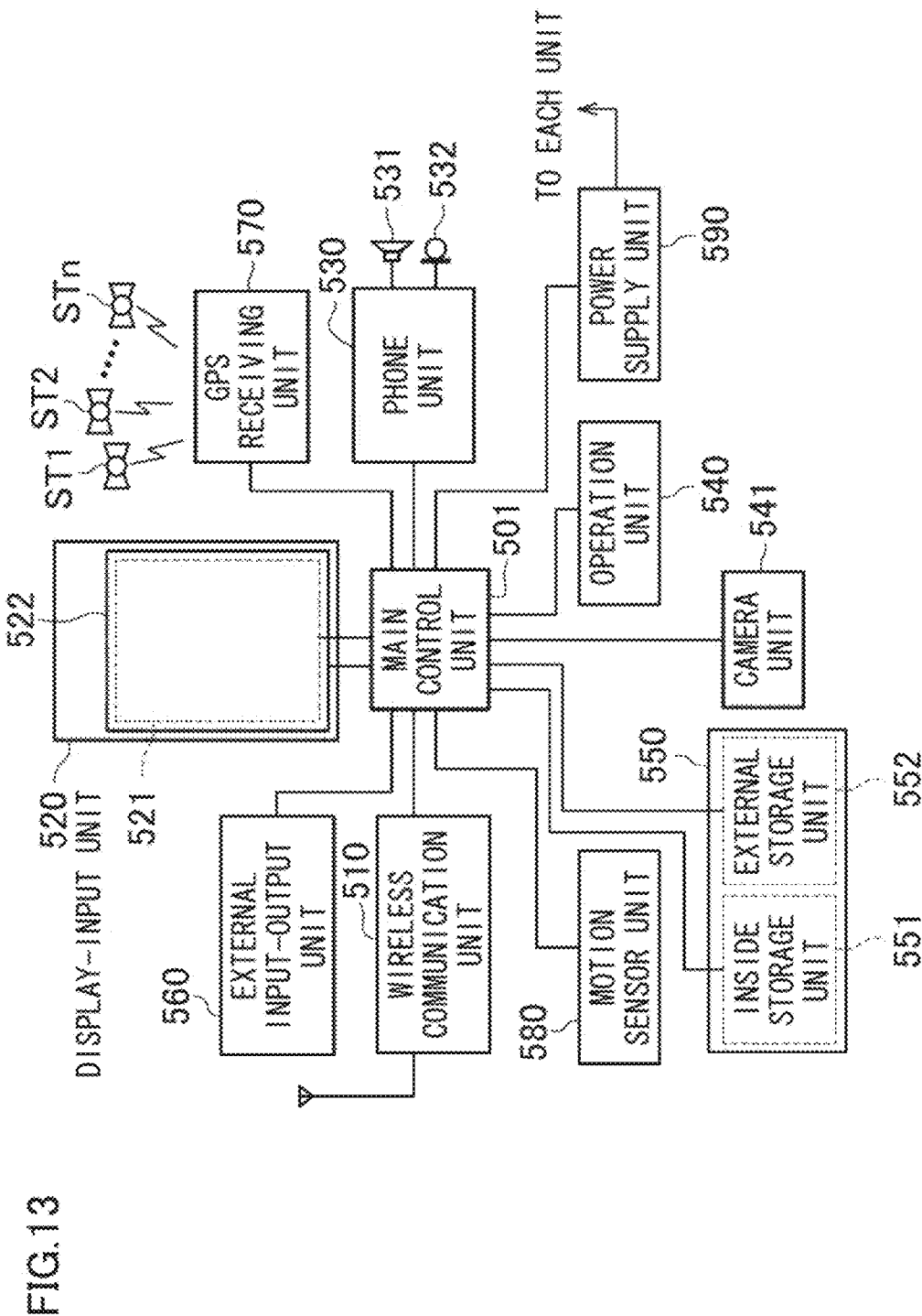
FIG. 13 is block diagram showing a configuration of the smartphone shown in FIG. 12.

FIG. 13 is a block diagram showing a configuration of the smartphone 500 shown in FIG. 12. As shown in FIG. 13, the smartphone 500 includes: a wireless communication unit 510; a display-input unit 520; a phone unit 530; an operation unit 540; a camera unit 541; a storage unit 550; an external input-output unit 560; a global positioning system (GPS) receiving unit 570; a motion sensor unit 580; a power supply unit 590; and a main control unit 501. In addition, the smartphone 500 has a wireless communication function of performing mobile wireless communication through a base station device BS and a mobile communication network NW.

The wireless communication unit 510 performs wireless communication with respect to the base station device BS installed in the mobile communication network NW in accordance with an instruction of the main control unit 501. By using the wireless communication, transmission and reception of various file data such as voice data and image data, electronic mail data, and reception of Web data, streaming data and the like, are performed.

The display-input unit 520 is so-called a touch panel that displays an image (a still image and a dynamic image), character information, and the like, by control of the main control unit 501 to visually transmit information to a user, as well as detects a user operation with respect to the displayed information. The display-input unit 520 includes a display panel 521 and an operation panel 522.

The display panel 521 is formed by using a liquid crystal display (LCD), an organic electro-luminescence display (OELD), and the like as a display device. It is possible to use a hybrid type display panel other than a transmissive type display (liquid crystal) panel as the display panel 521. The display panel 521 has the backlight local dimming control function in accordance with the embodiment above. The smartphone 500 in accordance with the present embodiment performs the BLD control in accordance with the embodiment above when an image that is stored in the storage unit 550, or that is received through the wireless communication unit 510, the external input-output unit 560, and the like, or that is photographed by the camera unit 541, is displayed in the display panel 521.

The operation panel 522 is mounted so that an image displayed in a screen of the display panel 521 is visible, and is a device that detects one or more coordinate by an operation with a finger of a user or a stylus. When the device is operated with a finger of a user or a stylus, a detection signal caused by the operation is outputted to the main control unit 501. The main control unit 501 then detects an operation position (coordinate) on the display panel 521 on the basis of the received detection signal.

As shown in FIG. 12, the display panel 521 and the operation panel 522 of the smartphone 500 are integrated to configure the display-input unit 520. The operation panel 522 is arranged so as to completely cover the display panel 521. In a case where the arrangement above is applied, the operation panel 522 may include a function of detecting a user operation in an area outside the display panel 521, that is, the operation panel 522 may include a detection area (hereinafter referred to as a display area) for an overlapping portion overlapped with the display panel 521, and a detection area (hereinafter referred to as a non-display area) for an outer periphery other than the display area, which does not overlap with the display panel 521.

A size of the display area may correspond with a size of the display panel 521, however, it is unnecessary to allow both sizes to correspond with each other. In addition, the operation panel 522 may include two sensitive areas of an outer periphery and an inside area other than the outer periphery. Further, a width of the outer periphery can be appropriately designed depending on a size of the body 502 and the like. Furthermore, any one of a matrix switch method, a resistive film method, a surface elastic wave method, an infrared ray method, an electromagnetic induction method, and a capacitance method, is applicable to the operation panel 522 as a position detection method.

The phone unit 530 includes the speaker 531 and the microphone 532, and converts voice of a user received through the microphone 532 into voice data that can be processed in the main control unit 501 to output the voice data to the main control unit 501, as well as decodes voice data received by the wireless communication unit 510 or the external input-output unit 560 to output the voice data from the speaker 531. In addition, as shown in FIG. 12, it is possible to mount the speaker 531 on a face in which the display-input unit 520 is provided, and mount the microphone 532 in a side face of the body 502, for example.

The operation unit 540 is a hardware key using a key switch and the like, and receives an instruction from a user. As shown in FIG. 13, for example, the operation unit 540 is mounted in a lower face below a display portion of the body 502 of the smartphone 500, and is a push button switch that is turned on when pressed with a finger and the like, and is turned off by restoring force of a spring and the like when the finger is removed.

The storage unit 550 stores the following: a control program and control data of the main control unit 501; an application software including an image processing program for creating a desired monocular 3D image in which, parallax is extended and reduced in accordance with the present invention; first and second half-moon filter groups; first and second conversion filter groups; first and second inverse filter groups; address data in which names of communications partners are correlated with telephone numbers, and the like; data of electronic mails that are transmitted and received; Web data downloaded by Web browsing; and content data that is downloaded, as well as temporarily stores streaming data and the like. The storage unit 550 is composed of an inside storage unit 551 built in the smartphone and an external storage unit 552 having an external memory slot to which an external storage is detachable. Each of the inside storage unit 551 and the external storage unit 552, which constitute the storage unit 550, is realized by using a storage medium, such as a flash memory type, a hard disk type, a multimedia card micro type, a card type memory (such as a Micro SD (registered trademark) memory), a Random Access Memory (RAM), and a Read Only Memory (ROM).

The external input-output unit 560 serves as an interface with all external apparatuses to be connected to the smartphone 500, in order to directly or indirectly connect to another external apparatus through communication (such as universal serial bus (USB), and IEEE 1394) or a network (such as the Internet, a wireless LAN, Bluetooth (registered trademark), Radio Frequency Identification (RFID), Infrared Data Association (IrDA: registered trademark), Ultra Wideband (UWB: registered trademark), and ZigBee (registered trademark)).

The smartphone 500 is connected to an external apparatus, such as: a wired/wireless headset; a wired/wireless external charger; a wired/wireless data port; a memory card, a Subscriber Identity Module (SIM) Card/, and an User Identity Module (UIM) Card, which are to be connected through the card socket; an external audio/video apparatus to be connected through an audio/video Input/Output (I/O) terminal, an external audio/video apparatus to be connected with wireless connection; a smartphone to be connected with wired/wireless connection; a personal computer to be connected with wired/wireless connection; a PDA to be connected with wired/wireless connection; and an earphone. The external input-output unit is capable of transmitting data transmitted from external apparatuses as described above to each of components in the smartphone 500 as well as allowing data in the smartphone 500 to be transmitted to the external apparatuses.

The GPS receiving unit 570 receives GPS signals transmitted from GPS satellites ST1 to STn in accordance with an instruction of the main control unit 501 to perform positioning calculation processing based on the received GPS signals, thereby detects a position of the smartphone 500, defined by a latitude, a longitude, and an altitude. In a case where location information can be acquired from the wireless communication unit 510 and the external input-output unit 560 (such as a wireless LAN), the GPS receiving unit 570 also can detect a position of the smartphone 500 by using the location information.

The motion sensor unit 580 includes a triaxial acceleration sensor and the like, for example, to detect a physical motion of the smartphone 500 in accordance with an instruction of the main control unit 501. By detecting the physical motion of the smartphone 500, a direction and acceleration of the motion of the smartphone 500 are detected. The detection result above is to be output to the main control unit 501.

The power supply unit 590 supplies electric power stored in a battery (not shown) to each of units of the smartphone 500 in accordance with an instruction of the main control unit 501.

The main control unit 501 includes a microprocessor and operates in accordance with a control program and control data stored in the storage unit 550 to perform centralized control of each of units of the smartphone 500. In addition, the main control unit 501 has a mobile communication control function of controlling each of units of a communication system, and an application processing function, in order to perform voice communication and data communication through the wireless communication unit 510.

The application processing function is realized by operating the main control unit 501 in accordance with application software stored in the storage unit 550. The application processing function includes an infrared ray communication function of performing data communication with a counterpart device by controlling the external input-output unit 560, an electronic mail function of performing transmission and reception of an electronic mail, a Web browsing function of browsing a Webpage, a function of creating a 3D image from a 2D image, and the like, for example.

In addition, the main control unit 501 includes an image processing function of displaying a video in the display-input unit 520 on the basis of image data (data of a still image and a dynamic image) such as received data and downloaded streaming data, and the like. The image processing function is a function in which the main control unit 501 decodes the image data above and applies image processing to the decoded result to display the image in the display-input unit 520.

Further, the main control unit 501 performs display control with respect to the display panel 521 and operation detection control which detects a user operation through the operation unit 540 and the operation panel 522.

Performing the display control allows the main control unit 501 to display a software key such as an icon for starting up application software and a scroll bar, or a window for creating an electronic mail. The scroll bar serves as a software key of receiving an instruction of moving a displaying portion of an image that is too large to fit in a display area of the display panel 521, and the like.

In addition, performing the operation detection control allows the main control unit 501 to detect a user operation through the operation unit 540, and receive an operation with respect to the icon described above and input of a character string into an input section of the window described above, through the operation panel 522, or receive a request for scrolling a display image, through the scroll bar.

Further, performing the operation detection control allows the main control unit 501 to have a touch panel control function of determining whether an operation position with respect to the operation panel 522 is an overlapping portion (display area) overlapped with the display panel 521 or an outer periphery (non-display area) other than the overlapping portion, which does not overlap with the display panel 521, in order to control a sensitive area of the operation panel 522 and a display position of a software key.

The main control unit 501 is also capable of detecting a gesture operation with respect to the operation panel 522 to allow a predetermined function to be performed in accordance with the detected gesture operation. The gesture operation is not a conventional simple touch operation but an operation such as drawing a trail with a finger, assigning a plurality of positions at the same time, or drawing a trail for at least one of the plurality of positions in combination with both operations.

The camera unit 541 is a digital camera of performing electronic photographing by using an imaging element such as a Complementary Metal Oxide Semiconductor (CMOS) and a Charge-Coupled Device (CCD). In addition, the camera unit 541 is capable of converting image data acquired by photographing into compressed image data such as a Joint Photographic coding Experts Group (JPEG) by control of the main control unit 501 to record the compressed image data in the storage unit 550 or output it through the external input-output unit 560 or the wireless communication unit 510. In the smartphone 500 shown in FIG. 12, the camera unit 541 is mounted on a face in which the display-input unit 520 is mounted, but a mounting position of the camera unit 541 is not limited to the above. The camera unit 541 may be mounted on a back face of the display-input unit 520, or a plurality of camera units 541 may be mounted. In a case where a plurality of camera units 541 is mounted, it is possible to perform photographing with a camera unit 541 selected to be used for the photographing, as well as with using the plurality of camera units 541 at the same time.

In addition, the camera unit 541 is available to various functions of the smartphone 500. It is possible, for example, to display an image acquired by the camera unit 541 in the display panel 521, as well as to use an image acquired by the camera unit 541 as one of operation inputs of the operation panel 522. When the GPS receiving unit 570 detects a position, it is also possible to detect the position by referring to an image received from the camera unit 541. Further, it is also possible to determine an optical axis direction of the camera unit 541 of the smartphone 500 by referring to an image received from the camera unit 541, without using a triaxial acceleration sensor or together with using the triaxial acceleration sensor, and to determine present use environment. It is certainly possible to use an image received from the camera unit 541 in application software.

Other than the above, it is also possible to record image data of a still image or a moving image in the storage unit 550 by adding information, such as location information acquired by the GPS receiving unit 570, voice information acquired by the microphone 532 (text information acquired by performing speech-to-text conversion with a main control unit 501 and the like is available), and posture information acquired by the motion sensor unit 580, and to output the image data through the external input-output unit 560 and the wireless communication unit 510.

In the embodiment above, although the digital camera 50 and the camera unit 541 of the smartphone 500 have a dynamic range extension function (wide dynamic range composition function), those without the function may be available. The BLD control function of the present invention is applicable even to an image photographed by a photographing unit without the dynamic range extension function.

The present invention is not limited to the embodiments described above, therefore, it is needless to say that a variety of modifications are possible within a range without departing from the spirit of the present invention.

What is claimed is:

1. An image display device comprising:
   an image acquisition unit configured to acquire a wide dynamic range image formed by performing dynamic range extension processing or a normal image without dynamic range extension processing;
   a transmissive type display panel configured to display the wide dynamic range image or the normal image acquired by the image acquisition unit;
   a backlight unit that is provided in a back face of the transmissive type display panel, the backlight unit configured to control luminance of backlight with respect to the transmissive type display panel for each of divided segments;
   a determination unit configured to determine whether an image acquired by the image acquisition unit is the wide dynamic range image or the normal image based on meta data read out from the image acquired by the image acquisition unit; and
   a control unit configured to control the backlight unit so that backlight luminance of a segment corresponding to a higher luminance portion suppressed by dynamic range extension processing in the wide dynamic range image becomes higher than backlight luminance of a segment corresponding to a lower brightness portion in the wide dynamic range image, only when the image acquired by the image acquisition unit is determined to be the wide dynamic range image by a determination result of the determination unit.

2. The image display device according to claim 1, wherein the control unit controls the backlight unit so that each of all the segments has a same backlight luminance when the image acquired by the image acquisition unit is determined to be the normal image by the determination result of the determination unit.

3. The image display device according to claim 1, wherein the image acquisition unit acquires the wide dynamic range image and acquires composition information related to wide dynamic range composition, which is associated with the wide dynamic range image from meta data of the wide dynamic range image, and the determination unit determines whether the image acquired by the image acquisition unit is the wide dynamic range image or the normal image in accordance with the acquired composition information.

4. The image display device according to claim 3, wherein the wide dynamic image is formed by performing the dynamic range extension processing by using a first image and a second image which is photographed with lower sensitivity or lower exposure with respect to the first image,
the wide dynamic range image includes a lower brightness portion equal to or less than a predetermined threshold value, the lower brightness portion being formed by using only the first image, and a higher luminance portion exceeding the threshold value, the higher luminance portion being formed by using at least the second image, and the composition information includes the threshold value.

5. The image display device according to claim 4, wherein the control unit determines a pixel with luminance exceeding the threshold value in the wide dynamic range image to be a pixel in the higher luminance portion in accordance with the threshold value included in the composition information.

6. The image display device according to claim 1, wherein the control unit includes an extract unit configured to extract a plurality of pixels corresponding to each of segments of the backlight unit from the wide dynamic range image for each of the segments thereof, and if it is determined that a number of the pixels equal to or more than a predetermined ratio in the extracted plurality of pixels corresponds to the pixel in the higher luminance portion, or that an average value of luminance of the extracted plurality of pixels is a luminance value corresponding to the higher luminance portion, the control unit controls the backlight unit so that backlight luminance of the segments is increased.

7. The image display device according to claim 6, wherein the control unit includes a storage unit configured to store a table or a calculation expression showing a relationship between a representative luminance value of the plurality of pixels corresponding to each of the segments of the backlight unit and a backlight luminance, and the control unit calculates corresponding backlight luminance in accordance with the representative luminance value of the plurality of pixels extracted by the extract unit and the table or the calculation expression stored in the storage unit and controls the backlight unit in accordance with the backlight luminance calculated for each of the segments of the backlight unit.

8. The image display device according to claim 7, wherein the image acquisition unit acquires the wide dynamic range image and composition information that is related to wide dynamic range composition and is associated with the wide dynamic range image, the composition information includes information related to extension of the dynamic range of the wide dynamic range image, the storage unit stores a plurality of tables or calculation expressions that correspond to the extension of the dynamic range of the wide dynamic range image, and that increase the backlight luminance as the dynamic range becomes wider, and the control unit acquires, in accordance with the information related to the extension of the dynamic range included in the composition information, a table or a calculation expression corresponding thereto from the storage unit, thereby calculating the backlight luminance by using the table or the calculation expression.

9. The image display device according to claim 6, wherein the wide dynamic image is formed by performing the dynamic range extension processing by using a first image and a second image which is photographed with lower sensitivity or lower exposure with respect to the first image, the image acquisition unit acquires the wide dynamic range image and a gain correction table that is associated with the wide dynamic range image, and that corresponds to a difference between gradation conversion characteristics of the first image and those of the wide dynamic range image, and the control unit calculates the backlight luminance for each of the segments in accordance with the acquired gain correction table and the representative luminance value of a plurality of the pixels corresponding to each of the segments of the backlight unit.

10. An image display method comprising:

an image acquiring step of acquiring a wide dynamic range image formed by performing dynamic range extension processing or a normal image without dynamic range extension processing;

a display step of displaying the wide dynamic range image or the normal image acquired by the image acquiring step on a transmissive type display panel;

a determination step of determining whether the image acquired by the image acquiring step is the wide dynamic range image or the normal image based on meta data read out from the image acquired by the image acquiring step; and a controlling step of controlling a backlight unit that is provided in a back face of the transmissive type display panel, the backlight unit configured to control luminance of backlight with respect to the transmissive type display panel for each of divided segments, wherein in the controlling step, only when the image acquired by the image acquiring step is determined to be the wide dynamic range image by a determination result of the determination step, the backlight unit is controlled so that the backlight luminance of the segment corresponding to the higher luminance portion suppressed by the dynamic range extension processing in the wide dynamic range image becomes higher than the backlight luminance of the segment corresponding to the lower brightness portion in the wide dynamic range image.

* * * * *